(12) United States Patent
Liao et al.

(10) Patent No.: US 12,271,376 B1
(45) Date of Patent: Apr. 8, 2025

(54) GENERATING METADATA FROM A SCAN OF A DATA OBJECT IN AN OBJECT STORE FOR PERFORMING SUBSEQUENT QUERIES TO THE DATA OBJECT

(71) Applicant: Amazon Technologies, Inc., Seattle, WA (US)

(72) Inventors: Ning Liao, Sammamish, WA (US); Fusheng Yuan, Kenmore, WA (US); Kaiwen Qu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 304 days.

(21) Appl. No.: 15/983,942

(22) Filed: May 18, 2018

(51) Int. Cl.
G06F 16/00 (2019.01)
G06F 9/54 (2006.01)
G06F 16/2453 (2019.01)
G06F 16/9535 (2019.01)

(52) U.S. Cl.
CPC ........ G06F 16/24539 (2019.01); G06F 9/547 (2013.01); G06F 16/24537 (2019.01); G06F 16/9535 (2019.01)

(58) Field of Classification Search
CPC ........ G06F 16/24539; G06F 16/24534; G06F 16/24537; G06F 16/9535; G06F 9/547; G06F 16/24; G06F 16/242; G06F 16/245
See application file for complete search history.

(56) References Cited

U.S. PATENT DOCUMENTS

| | | | |
|---|---|---|---|
| 6,697,808 B1* | 2/2004 | Hurwood | G06F 16/907 |
| 7,606,816 B2 | 10/2009 | Kulkarni | |
| 7,962,495 B2* | 6/2011 | Jain | G06F 16/21 |
| | | | 706/2 |
| 8,150,838 B2* | 4/2012 | Allen | G06F 16/2455 |
| | | | 707/731 |
| 8,620,884 B2* | 12/2013 | Calder | G06F 16/24561 |
| | | | 707/696 |
| 8,738,669 B1* | 5/2014 | Hsu | G06F 16/13 |
| | | | 707/822 |
| 10,503,730 B1* | 12/2019 | Speers | G06F 16/2365 |
| 10,528,599 B1* | 1/2020 | Pandis | G06F 16/2455 |
| 2004/0015487 A1* | 1/2004 | Lin | G06F 16/289 |
| | | | 707/999.003 |
| 2008/0256025 A1* | 10/2008 | Bestgen | G06F 16/903 |
| | | | 707/E17.135 |
| 2008/0306903 A1 | 12/2008 | Larson et al. | |
| 2009/0240678 A1* | 9/2009 | Sadovsky | G06F 16/40 |
| | | | 707/999.001 |
| 2009/0248634 A1* | 10/2009 | Allen | G06F 16/2455 |

(Continued)

FOREIGN PATENT DOCUMENTS

EP 1559034 B1 * 8/2017 ............ G06F 16/93

*Primary Examiner* — Jean M Corrielus
(74) *Attorney, Agent, or Firm* — S. Scott Foster; Kowert, Hood, Munyon, Rankin & Goetzel, P.C.

(57) ABSTRACT

An object data store may generate metadata responsive to a request that causes a scan of a data object for subsequent use in performing queries to the data object. A request may be received that causes a scan operation of the data object. As part of performing the scan one or multiple types of metadata describing the data object may be generated. The generated metadata may be applied to access the data object and perform a subsequently received query to the data object at the object data store.

19 Claims, 10 Drawing Sheets

(56) References Cited

U.S. PATENT DOCUMENTS

| | | | |
|---|---|---|---|
| 2010/0082655 A1* | 4/2010 | Silberstein | G06F 16/2455 707/E17.014 |
| 2010/0106695 A1* | 4/2010 | Calder | G06F 16/2255 707/696 |
| 2010/0106734 A1* | 4/2010 | Calder | G06F 16/93 707/E17.014 |
| 2010/0332660 A1* | 12/2010 | Fonseca | G06F 16/2455 709/224 |
| 2011/0225293 A1* | 9/2011 | Rathod | H04W 4/60 709/224 |
| 2012/0281254 A1* | 11/2012 | Boyer | G06F 3/1244 358/1.16 |
| 2013/0124466 A1* | 5/2013 | Naidu | G06F 16/27 707/610 |
| 2013/0311521 A1* | 11/2013 | Calder | G06F 16/40 707/816 |
| 2014/0012799 A1* | 1/2014 | Eberlein | G06F 16/3331 707/603 |
| 2015/0205834 A1* | 7/2015 | Keeton | G06F 16/14 707/760 |
| 2016/0026672 A1* | 1/2016 | Zhang | G06F 16/13 707/686 |
| 2016/0103880 A1* | 4/2016 | Attaluri | G06F 16/24544 707/714 |
| 2017/0123935 A1* | 5/2017 | Pandit | G06F 16/2219 |
| 2017/0160931 A1* | 6/2017 | Thakkar | G06F 3/0688 |
| 2017/0277453 A1* | 9/2017 | Huang | G06F 9/44505 |
| 2017/0277726 A1* | 9/2017 | Huang | H04L 67/02 |
| 2018/0121457 A1* | 5/2018 | Sawhney | G06F 16/1873 |
| 2018/0150548 A1* | 5/2018 | Shah | G06F 16/211 |
| 2018/0173756 A1* | 6/2018 | Lawton | G06F 16/2228 |

* cited by examiner

GENERATING METADATA FROM A SCAN OF A DATA OBJECT IN AN OBJECT STORE FOR PERFORMING SUBSEQUENT QUERIES TO THE DATA OBJECT

BACKGROUND

Many applications are being implemented using network-accessible services, such as the kinds of virtualized computing services, storage services and the like which may be provided using the resources of provider networks or public cloud environments. Virtualized computing services, for example, may enable clients to utilize essentially unlimited amounts of compute power for their applications, with additional resources being automatically deployed as the application workload grows. Similarly, database and storage services may allow clients to store vast amounts of data using fast high-availability configurations.

A number of different types of data models may be supported by these database and data storage services. In some cases, for example, relational data models may be used, while in other cases, key-value or "noSQL" models may be used. Services that enable clients to store large objects (e.g., as collections of bytes that are typically opaque to the service provider, with no requirements for schemas or structure for accessing the objects, which are sometimes referred to as unstructured or semi-structured data objects) represent another popular alternative. For example, some object storage services may allow clients to create individual objects that may reach terabytes in size, and access the objects using simple web services requests (such as "get", "put", and the like) directed to respective unique URLs designated for the objects.

In many cases, data objects stored in services or data stores that utilize object data models may be processed for "big data" analytics applications, machine learning applications and the like. Large data objects may be retrieved from the service or data store to a set of computing platforms where a particular analytics application is to be executed; in some scenarios, however, only a relatively subset of the contents of the object may actually be required for the application. Enabling customers of object data stores or storage services to reduce the amount of data that has to be transferred for processing even though the object storage service does not maintain a schema or structure for the object in a customized, application-specific manner, while still providing the benefits associated with web-services-based access to large data items, remains a non-trivial technical challenge.

Figure 1:
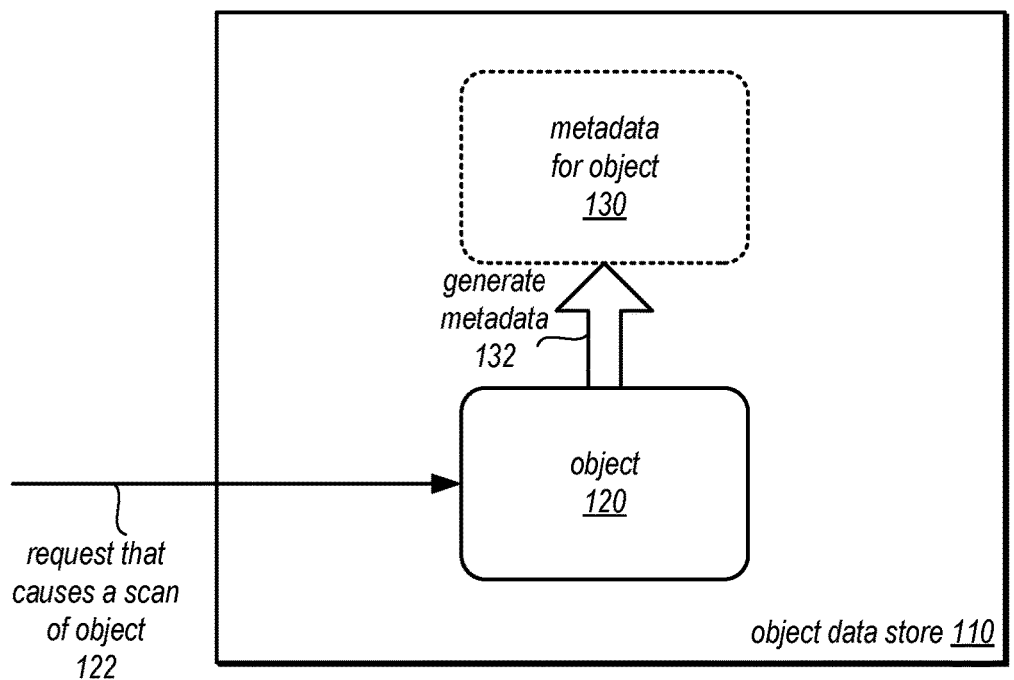
FIG. 1 is a logical block diagram generating metadata from a scan of a data object in an object data store for performing subsequent queries to the data object, according to some embodiments.
Figure 1:
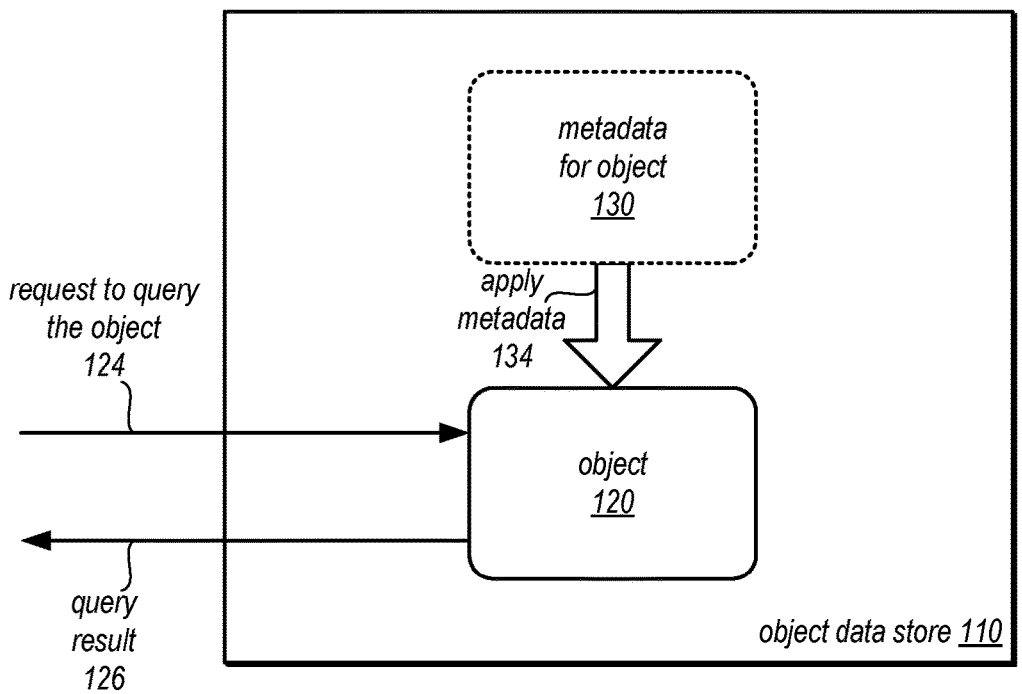

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Generating metadata from a scan of a data object in an object data store for performing subsequent queries to the data object may be implemented in various embodiments, as described herein. An object data store may, for example, enable clients to create, access and manipulate data items or objects comprising collections of data (e.g., bytes) for which no specific schema or information indicating internal structure (e.g., without storing structure indicating fields or columns of the object) may be required to store the object, at least at the time of object creation or instantiation, in some embodiments. From the perspective of the object data store, the semantics of the contents of individual data items may typically be unknown by default—e.g., the data types of subsets of an individual data objects, even if it is several gigabytes or even petabytes in size, may not be provided to the object data store at the time that the item is stored at the object data store in various embodiments. Of course, the semantics and structure (if any) of the content of data objects may be well known to the clients on whose behalf the objects are stored, in some embodiments. In some embodiments, the data objects may be grouped into containers (e.g., item collections or buckets)—e.g., a client of the object data store may first create a container, and then create individual data objects within the container.

Data objects may be accessed (e.g., via read requests submitted via programmatic interfaces) and analyzed for a variety of applications in different embodiments at the object data store. For at least some applications, only a relatively small subset of the contents of a given data object may be required. For example, consider a simple example scenario in which a given data object comprises the content of a large number of transaction records of an e-retailer, with a given transaction record indicating the name of a sold item, a category of the item, a timestamp indicating when the transaction occurred, a price of the item, and address information of the purchaser. The data object may comprise a byte sequence or string representing 10,000 such transaction records, e.g., with a selected delimiter (e.g., a new line character) separating the content of different transaction records, and another delimiter (e.g., a comma or tab) separating fields within a transaction record.

To analyze the distribution of different categories of sold items across different geographic regions, the category and address fields may suffice, while the remaining fields may not be required. One way to perform this example analysis would be to retrieve the entire object to a set of computing devices where the analysis computations are to be performed, and extract the subset of item contents at those computing devices. In at least some embodiments, however, the service at which the data objects are stored may support querying capabilities on the server-side: e.g., the required subset of data object contents may be extracted at the object data store servers, systems, or other resources based on query criteria or requirements specified by the client, and only the query results may be provided to the platforms where the application is to be run.

In order to provide query results, an object data store that stores data objects without storing a structure of the data object used to access the data object may, in various embodiments, perform a scan to read some or all of the data object one portion at a time (e.g., byte per byte) and evaluate the data with respect to the query. In various embodiments, query or other request that causes such a scan can be leveraged to collect metadata describing the data object that may be beneficial for improving the performance of subsequent queries at the object data store in addition to evaluating the data with respect to the query. For example, as one skilled in the art will appreciate in light of this disclosure, certain embodiments may be capable of achieving various advantages for object data stores that perform server-side query processing, including some or all of the following: (a) collecting or generating metadata that provides structural information to efficiently locate desired data for a query, and/or (b) collecting or generating metadata that describes the data in order to efficiently plan the performance of a query so that the overall time required to complete processing of at least some applications that involve the analysis of items stored at the object storage service can be significantly reduced. For example, generating offset metadata (e.g., in bytes) when performing a scan may allow for subsequent queries to be performed as range queries, in some embodiments. Without such offset metadata, a range query could not be supported because portions of the data object (e.g., records) could be broken across storage unit (e.g., byte) boundaries. Consider comma separated value (CSV) data format. A single CSV row/record may cross two consecutive byte range boundaries because a newline can be enclosed within double quotes. In such scenarios, all the content enclosed within double quotes including the newline may comprise a field. In order to correctly parse data in this format, each byte range boundary may need to handle a broken record (either at the end or at the beginning of the record).

FIG. 1 is a logical block diagram generating metadata from a scan of a data object in an object data store for performing subsequent queries to the data object, according to some embodiments. According to at least some embodiments, one or more data objects, such as object 120, may be stored in object data store 110, e.g., in response to one or more programmatic requests. The content of a given data object may vary based on the applications and/or sources of the stored data—e.g., in some cases, delimited text records may be stored in a data object, while in other cases the contents of an API may include a text or multimedia document such as a web page, still photographs, video, audio, raw sensor data, and the like. A number of techniques may be used to ensure high availability and resiliency of the data objects in different embodiments—e.g., various types of erasure coding, redundancy/replication algorithms and the like may be used. A wide variety of underlying physical storage device types may be employed in some embodiments—e.g., any combination of fast-access-time rotating disks, slower-access-time archival devices, solid-state drives, and/or main memory may be used. In at least one embodiment, the service may be implemented at a provider network, and a set of web-services interfaces (e.g., Representation State Transfer or REST application programming interfaces (APIs)) may be used to create and access the data objects.

As indicated in scene 102, a request 122 that causes a scan of object 120 may be received at object data store 110. The request may, for instance, be a request to query object 120, a request to generate metadata, or a request to store object 120, in some embodiments, similar to the requests discussed below with regard to FIG. 5. The scan caused by the request may be used to generate metadata for object 130 (e.g., record boundaries, table statistics, etc.) that describes the physical and/or logical structure of data within the data object, the content of the data object, or other features of the data object which may be used to improve or optimize performance of subsequent queries to the data object, in some embodiments.

As illustrated in scene 104, a request 124 to query data object 120 may be received at object data store 110 (e.g., via a GET REST API request) in various embodiments. In order to perform the query, metadata 130 may be applied 134 to access object 120 and perform the query. Record boundaries may be used to perform a range query and/or perform parallelization to perform the query at different storage hosts storing different ranges of the object 120 in parallel. In some embodiments, the metadata may be applied to modify the performance of the query by changing the order of operations (e.g., changing or determining join operation orders) and/or selecting operations, in some embodiments. Query result 126 may be provided as either a singular result or a stream of results in different embodiments.

Please note that previous descriptions are not intended to be limiting, but are merely provided as examples of generating metadata from a scan of a data object in an object data store for performing subsequent queries to the data object. Various other components or arrangements of components may make up an object data store to generate metadata from a scan of a data object in an object data store for performing subsequent queries to the data object. Data may also be placed differently according to different embodiments (e.g., in distributed fashion across multiple storage locations).

This specification next includes a general description of a provider network, which may implement an object storage service that implements generating metadata from a scan of a data object in an object data store for performing subsequent queries to the data object. Then various examples of an object storage service are discussed, including different components, or arrangements of components that may be employed as part of implementing the object storage service. A number of different methods and techniques to implement generating metadata from a scan of a data object in an object data store for performing subsequent queries to the data object, some of which are illustrated in accompanying flowcharts. Finally, a description of an example computing system upon which the various components, modules, systems, devices, and/or nodes may be implemented is provided. Various examples are provided throughout the specification.

Figure 2:
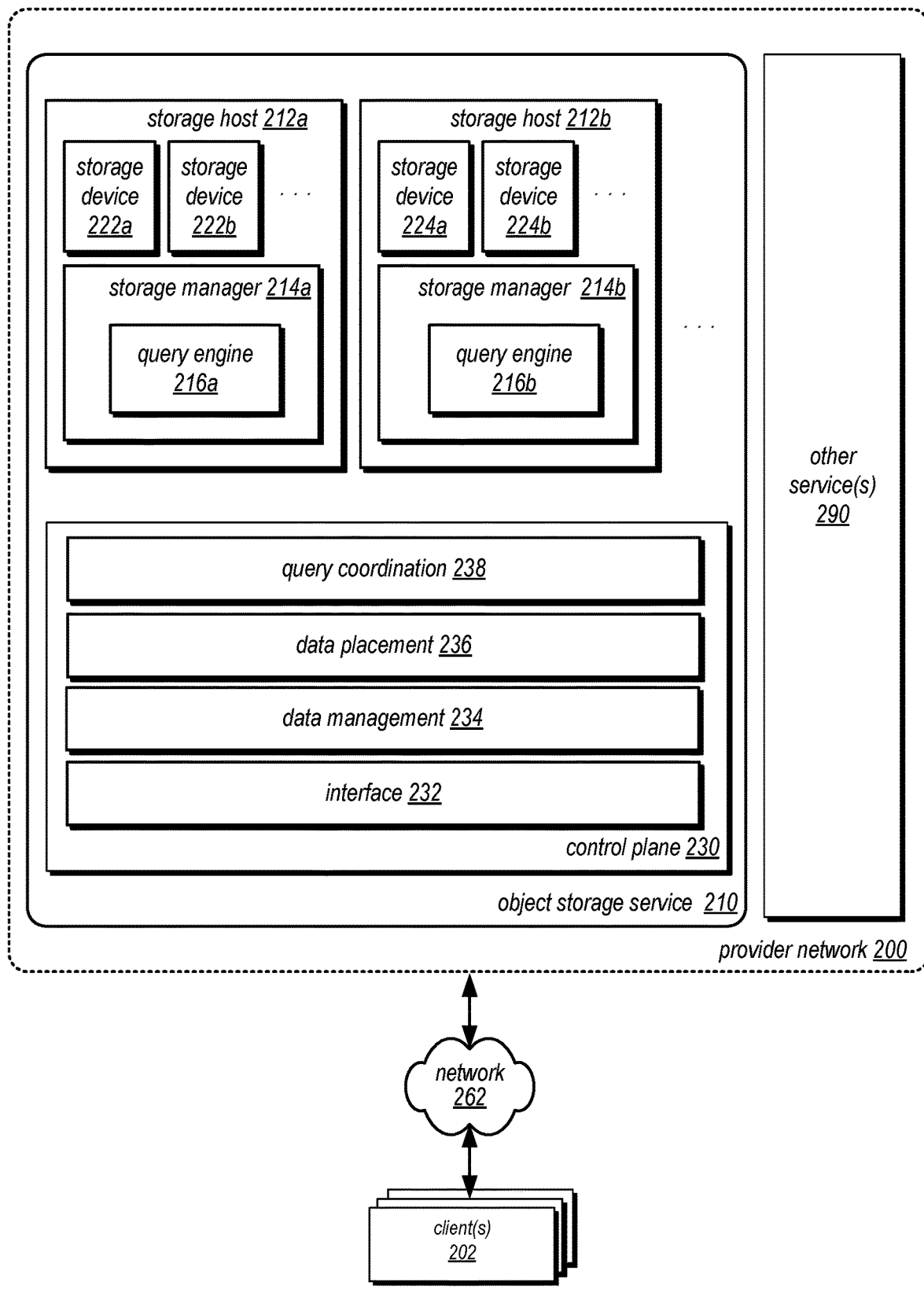
FIG. 2 is a logical block diagram illustrating a provider network that offers an object storage service that implements generating metadata from a scan of a data object in an object data store for performing subsequent queries to the data object, according to some embodiments.

FIG. 2 is a logical block diagram illustrating a provider network that offers an object storage service that implements retention-based data management, according to some embodiments. Provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may provide virtual storage services, such as object storage service 210. Object storage service 210 may offer client(s) 202 virtual containers or buckets in which to store one or multiple data objects.

In various embodiments, provider network 200 may implement object storage service 210 for performing storage operations. Object storage service 210 may be a storage system, composed of a pool of multiple storage hosts 212a, 212b, and so on (e.g., server storage systems), which provide object storage for storing data at storage devices 222a, 222b, and 224a, 224b according to the object storage scheme discussed below in FIG. 3. Data buckets may be mapped to particular client(s) (e.g., a particular customer account of provider network 200), providing unstructured object storage (e.g., other persistent storage) for data objects which may be retrieved via object keys.

Figure 9:
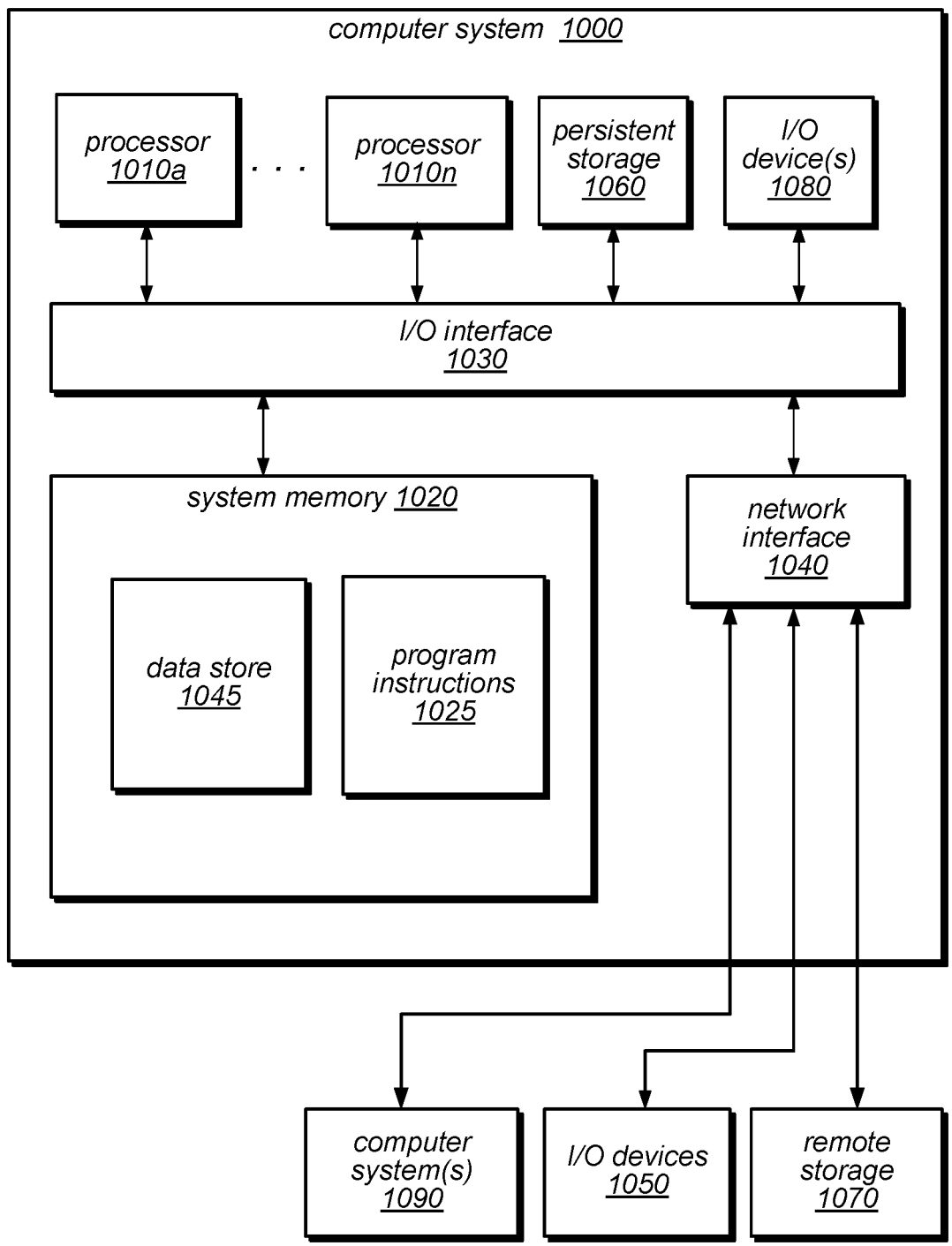
FIG. 9 is a block diagram illustrating an example computing system, according to some embodiments.

Storage hosts 212a, 212b may be one or more computing systems or devices, such as a storage server or other computing system (e.g., computing system 1000 described below with regard to FIG. 9). Each storage host may manage separate storage devices. Storage hosts may also provide multi-tenant storage. For example, in some embodiments, one storage host may maintain a data object (or portion of a data object) for one entity (e.g., a particular client or account of object storage service 230), while another data object maintained at the same storage host may be maintained for another entity (e.g., a different account). Storage hosts may persist their respective data objects in one or more persistent storage devices 222, 224 (e.g., hard disk drives, solid state drives, shingled magnetic recording (SMR) drives, etc.) that may be directly attached to a computing system or device implementing the respective storage host, in some embodiments. Storage hosts may implement different persistent storage devices, in some embodiments. For example, some storage hosts may implement solid state drives (SSDs) for persistent block storage, while other storage hosts may implement SMR drives or other magnetic-based persistent storage devices. In this way, different specifications, and other performance characteristics may be provided according to the persistent storage devices implemented at the storage host.

Object storage service may manage and maintain data objects in a variety of different ways. Storage manager 214a, 214b, may be implemented at storage hosts 212a and 212b respectively to manage data stored in storage devices. Different durability schemes may be implemented for some data objects among two or more storage hosts as a partitioned, sharded, and/or replicated data object, in some embodiments. Data may be maintained in data devices 222 and 224 in such a way as to provide security and privacy guarantees for client(s) 202. Storage managers 212 may enforce access policies for individual data objects or buckets, restricting access to data in data objects or buckets to those requestors that satisfy the access policy (e.g., by presenting appropriate identification or credentials). In this way, data stored in different data objects or buckets on the same storage host for different clients may be confidentially maintained so that an unauthorized request to access data may not be processed (even if the requestor has the right to access another data object or bucket hosted at the same storage host), in some embodiments. Storage managers 214 may handle access requests, such as get, put, create, or delete data objects. As discussed in detail below with regard to FIG. 4, storage manager may implement query engines, such as query engine 216a and 216b to perform queries to objects (or portions thereof) stored at storage hosts 212, in some embodiments.

Object storage service 210 may implement control plane 230 to assist in the operation of object storage service 210. In various embodiments, control plane 230 assists in managing the availability of data objects and buckets to clients. Control plane 230 may provide a variety of services related to providing object storage functionality, including the management of user accounts (e.g., creation, deletion, billing, collection of payment, etc.). Control plane 230 may further provide services related to the creation, usage and deletion of data buckets or objects in response to client requests according to data management 234 and data placement 236. Control plane 230 may also provide services related to the collection and processing of performance and auditing data related to the use of data buckets or objects and snapshots or versions of those buckets or objects.

In at least some embodiments, control plane 230 may implement query coordination 238, which may implement one or more resources for managing the performance of queries to a data object. For example, a coordination node (not illustrated) may receive and direct requests to storage hosts 212 that store respective portions of a data object). The coordination node may collect and combine results received from queries to the individual storage hosts and return a query result to a client (e.g., 202), in some embodiments. Query coordination 238 may determine whether parallelization of a query request can be performed and direct the performance of range processing at individual storage hosts in order to parallelize the performance of different portions of a query, in some embodiments.

Clients 202 may encompass any type of client configurable to submit requests to provider network 200. For example, a given client 202 may include a suitable version of a web browser, or may include a plug-in module or other type of code module configured to execute as an extension to or within an execution environment provided by a web browser. Alternatively, a client 202 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 202 in a manner that is transparent to applications implement on the client 202 utilizing computational resources provided by the compute instance. Client(s) 202 may be associated with particular user accounts, user identifiers, or other information which may indicate the access rights, resources, and other associated information maintained at multi-tenant provider network 200 on behalf of a client 202.

Clients 202 may convey network-based services requests to provider network 200 via external network 262. In various embodiments, external network 262 may encompass any suitable combination of networking hardware and protocols necessary to establish network-based communications between clients 202 and provider network 200. For example, a network 262 may generally encompass the various telecommunications networks and service providers that collectively implement the Internet. A network 262 may also include private networks such as local area networks (LANs) or wide area networks (WANs) as well as public or private wireless networks. For example, both a given client 202 and provider network 200 may be respectively provisioned within enterprises having their own internal networks. In such an embodiment, a network 262 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 200. It is noted that in some embodiments, clients 202 may communicate with provider network 202 using a private network rather than the public Internet. In some embodiments, clients of object storage service 210 may be internal to provider network 200 (e.g., applications, systems, or other components hosted at one or more of other service(s) 290, which may store, query, or otherwise access data objects in object storage service 210).

Figure 3:
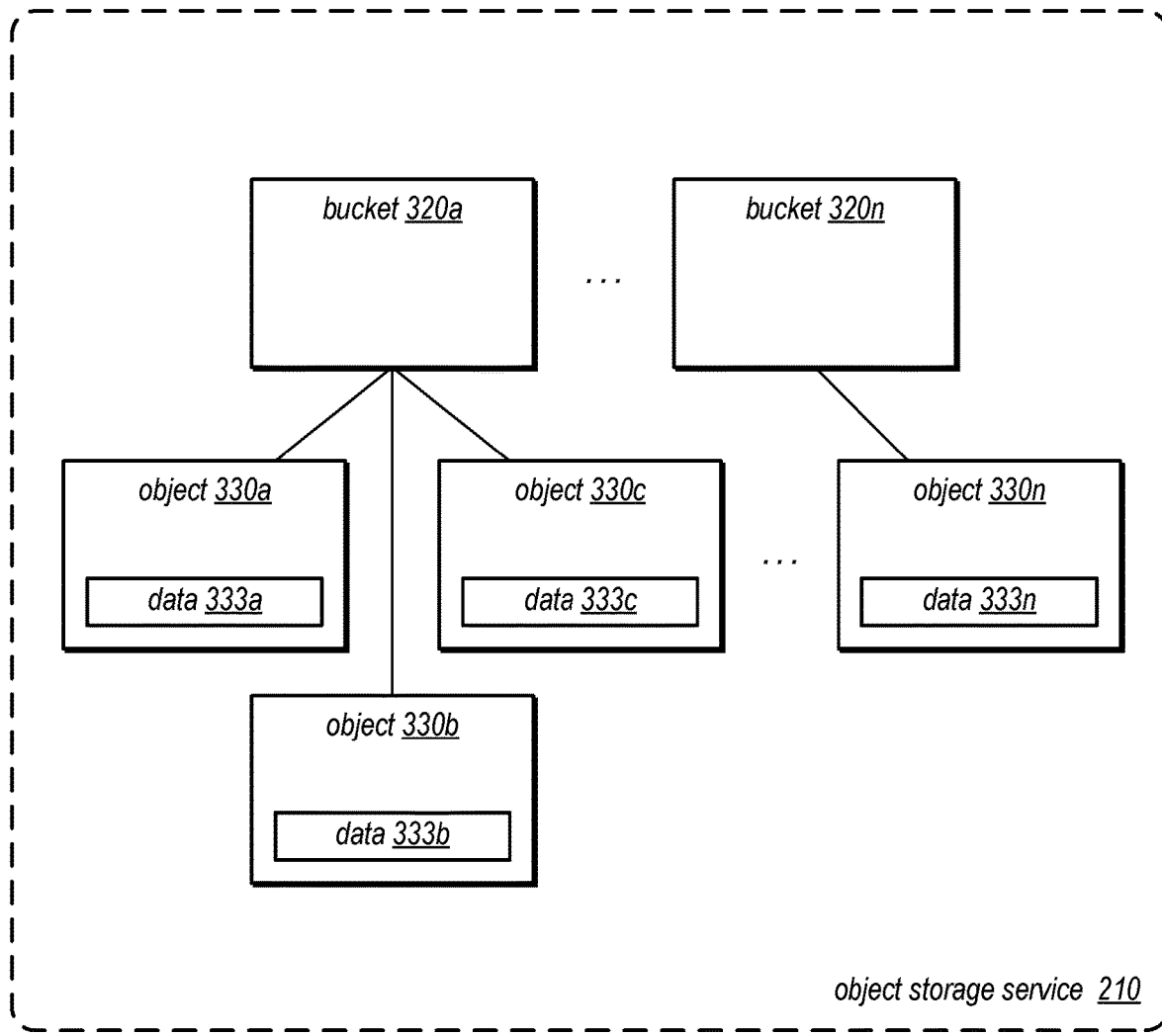
FIG. 3 is a logical block diagram illustrating an object storage scheme for an object storage service, according to some embodiments.

FIG. 3 is a logical block diagram illustrating an object-based storage scheme for an object storage service, according to some embodiments. Object storage service 210 may provide unstructured object storage model for providing virtualized storage resources to clients as a service, as illustrated in FIG. 2. In the illustrated model, storage service interface 232 provides a client-facing interface to object storage service 210. Storage service interface 232 may, for example, be implemented as, or alternatively may include, an application programming interface (API). According to the model presented to a client (e.g., clients 202 in FIG. 2) by interface 232, the storage service may be organized as an arbitrary number of buckets 320a-n accessible via interface 232 which may be hosted across storage hosts 222 and 224 in FIG. 2. Each bucket 320 may be configured to store an arbitrary number of objects 330a-n, which in turn may store data 333a-n specified by a client of the storage service 210. One or more clients may submit requests to the storage service interface to store, retrieve, and, as described in more detail below, perform one or more operations on data object 330. Storage service interface may provide responses to the requests, which may include acknowledgements and/or retrieved data, for example. Generally, in addition to storage and retrieval of data objects, the requests or commands that the storage service 210 may perform may include commands that modify or update data within the storage service 210. In this way, the clients are not burdened with removing the data from the storage service 210, performing the operations, and then returning the modified data to the storage service. This configuration may save network bandwidth and processing resources for the clients, for example. In some embodiments, the object storage service 210 may be configured to internally replicate data objects for data redundancy and resiliency purposes.

In some embodiments storage service interface 232 may be configured to support interaction between the object storage service 210 and its clients according to a web services model. For example, in one embodiment, interface 232 may be accessible by clients as a web services endpoint having a Uniform Resource Locator (URL) to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

In some embodiments, an object storage service 210 may provide read-after-write consistency for new data objects 330 when stored to the buckets 320. Read-after-write consistency for new objects 330 means that immediately after a write operation for a new object 330, the service 210 guarantees that the object 330 will be returned in response to a read operation. However, in some embodiments, an object storage service 210 may not guarantee that a new data object 330 will be immediately available for reads after a write operation. These embodiments thus provide eventual consistency for new data objects 330, rather than read-after write consistency.

In some embodiments, an object storage service 210 may provide eventual consistency for updates of existing objects 330 in the buckets 320. After an update operation is performed on an existing data object 330, it may take some period of time, generally seconds or minutes but possibly even hours or days, for the change to propagate to all instances of the data object 330. Thus, in some embodiments, the object storage service 210 may not guarantee that an access of a data object 330 stored in the storage service 210 will always return a latest or most recent version of the data object 330. This property of a storage service such as object storage service 210 may be referred to as eventual consistency, as a modified data object 330 is generally guaranteed to be only eventually consistent across all instances.

Figure 4:
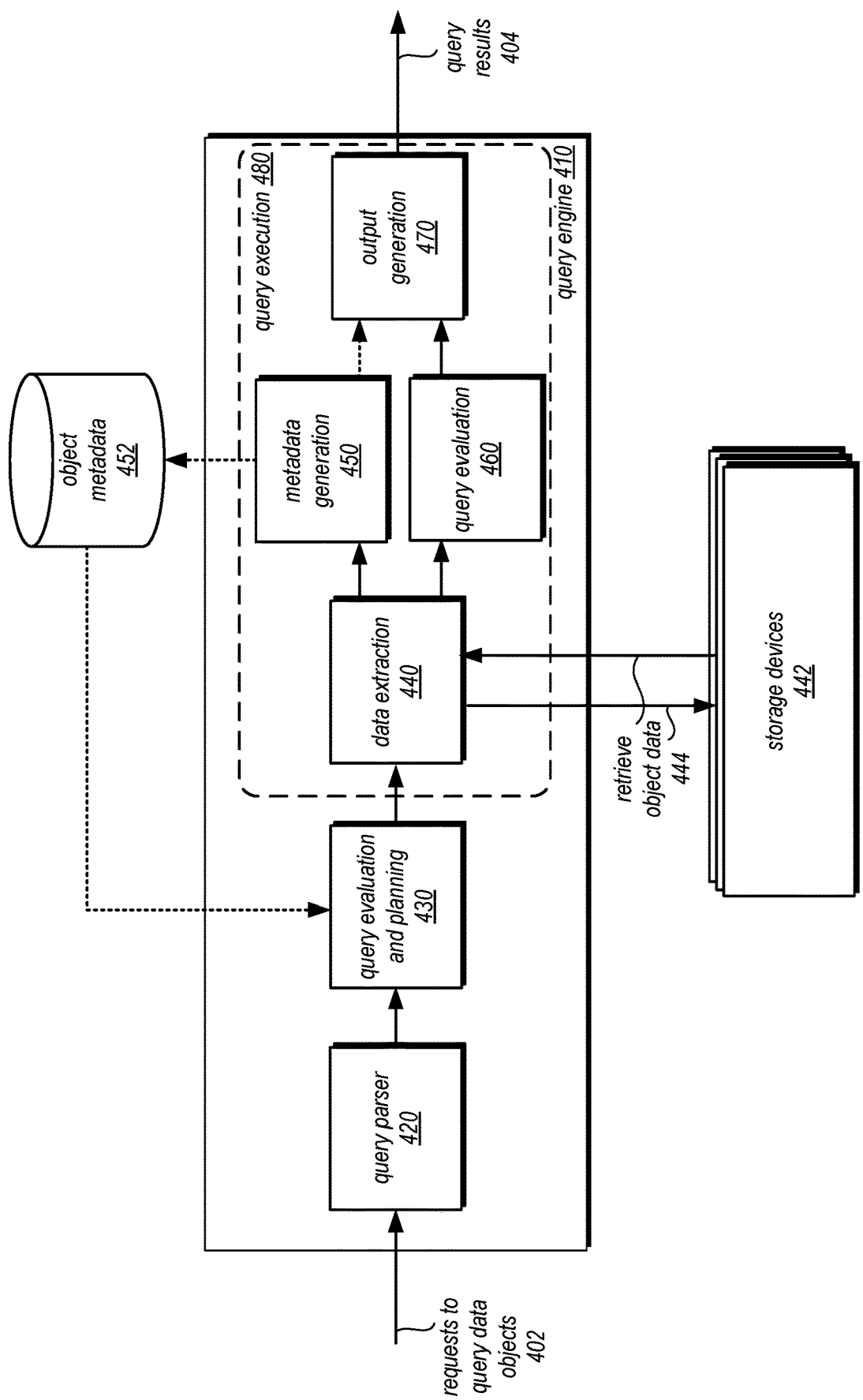
FIG. 4 is a logical block diagram illustrating a query engine that generates and applies metadata for queries, according to some embodiments.

FIG. 4 is a logical block diagram illustrating a query engine that generates and applies metadata for queries, according to some embodiments. Query engine 410 may be implemented as part of storage hosts, as discussed above with regard to FIG. 2 in order to perform queries (or portions thereof) where the data object is located instead of moving the data object. Query engine 410 may receive requests to query data objects 402, in various embodiments. The query requests may be received, in some embodiments, from a coordination node or subsystem implemented as part of the control plane for object storage service 210, in some embodiments, as discussed above with regard to FIG. 2.

Figure 8A:
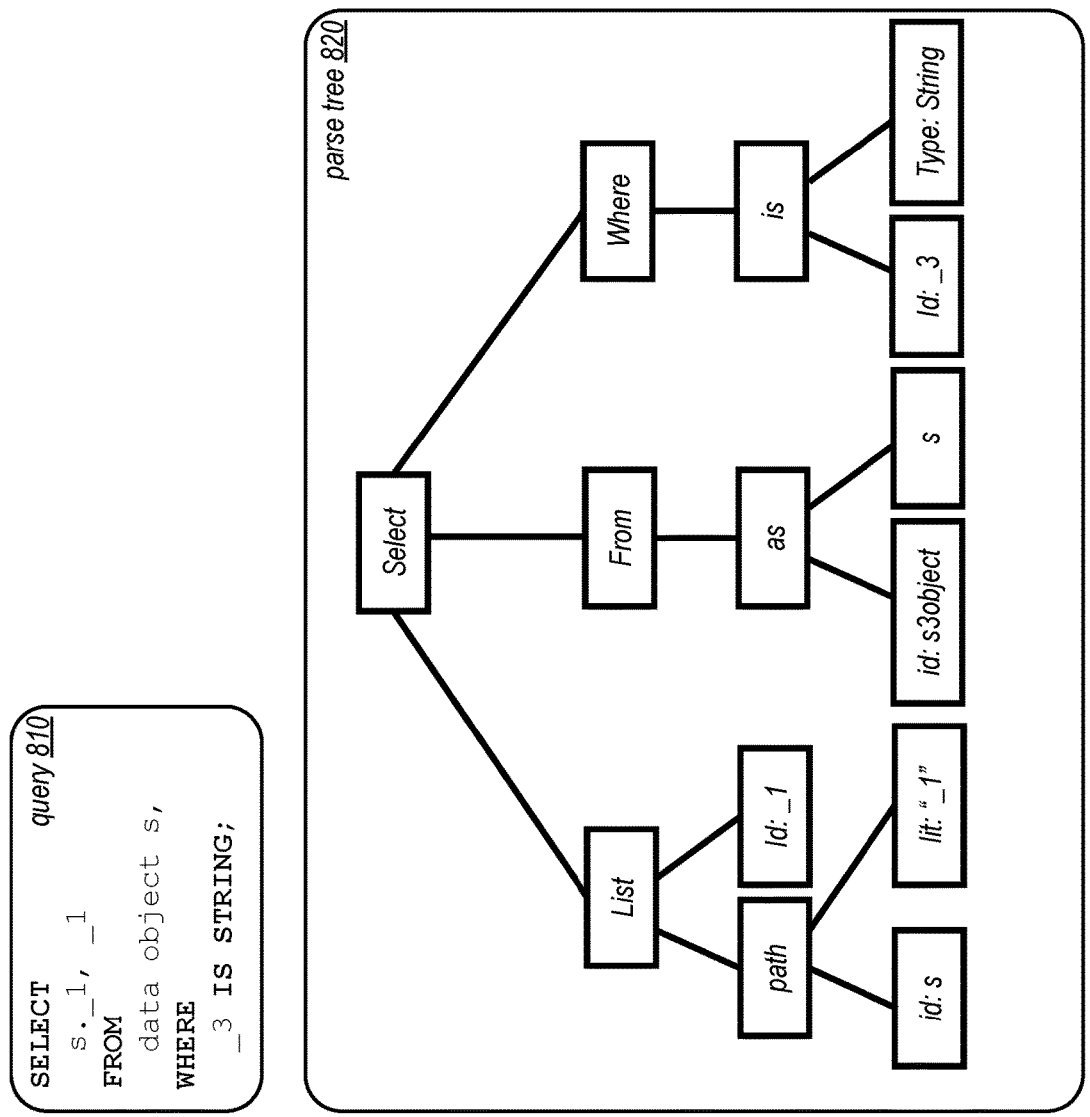
FIGS. 8A and 8B are example parse trees for identifying fields in records of a data object to materialize, according to some embodiments.
Figure 8B:
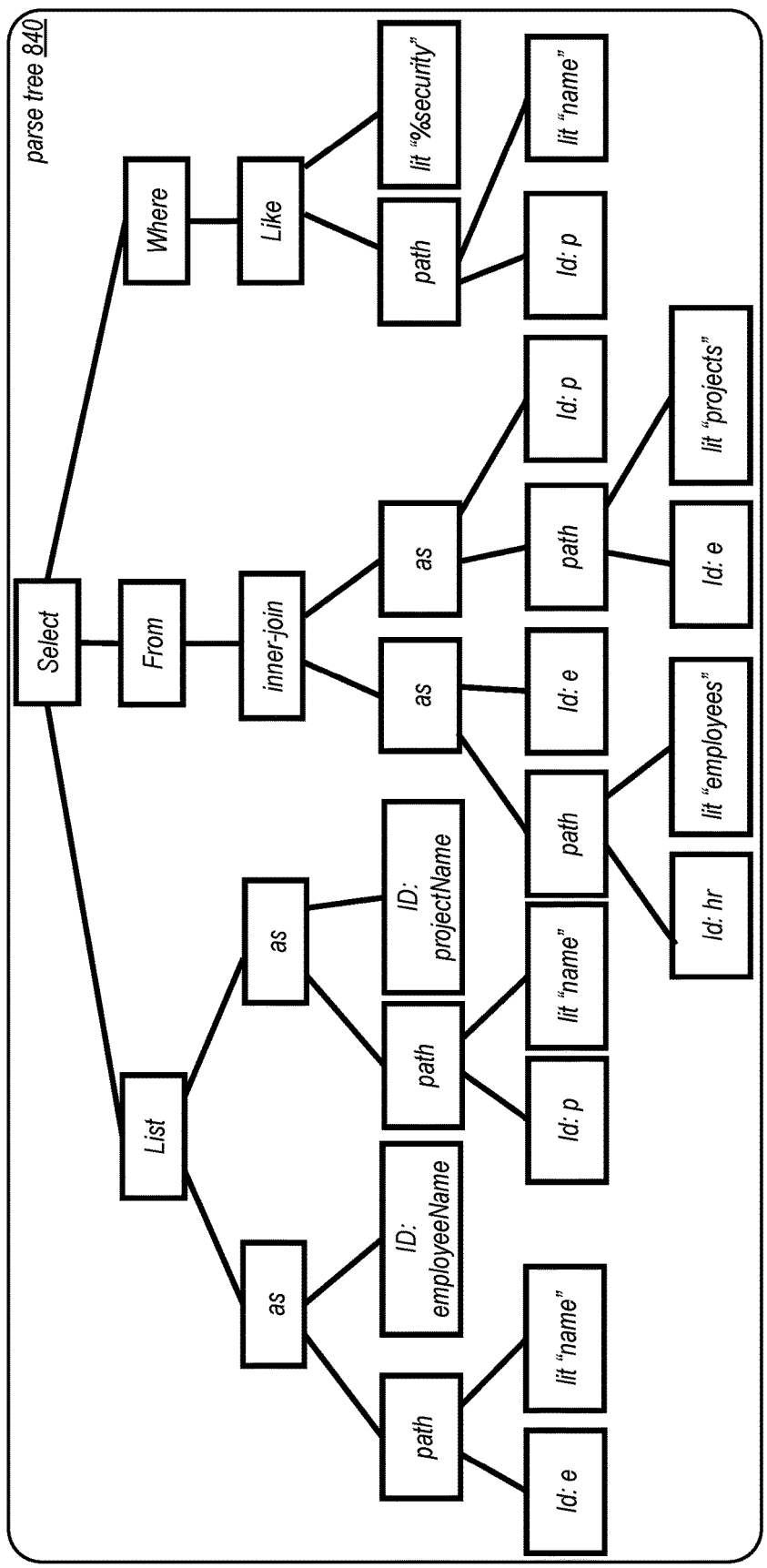

In at least some embodiments, query engine 410 may implement query parser 420 to receive a query statement other conditions or criteria for evaluating the data object with respect to the query and generated a parsed version of the query that may be evaluated, planned, optimized, and performed by query engine 410. For example, in some embodiments, a query statement may be converted to a set of tokens by a lexical analysis (which may perform operations such as whitespace removal, case normalization, and so on). The tokens may then be transformed by query parser 420 into a parse tree (e.g., an abstract syntax tree (AST) (as illustrated in FIGS. 8A and 8B) according to a parsing technique (e.g., recursive decent parser or other top-down parser, such as Top-Down Operator Precedence (TDOP) Pratt parser).

Query engine 410 may implement query evaluation and planning 430 in order to evaluate the operations of the query. In some embodiments, one or multiple plans may be generated by query planning and evaluation 430 according to cost prediction models to select the best plan. In some embodiments, object metadata 452 generated from previous queries (or other requests as discussed below with regard to FIG. 5) may be used to modify the plan operations (e.g., changing join order as discussed below with regard to FIG. 6). In some embodiments, query planning and evaluation may include determining which fields to materialize according to the techniques discussed below with regard to FIGS. 7-8B. Query planning and evaluation 430 may utilize object metadata to determine record boundaries or offsets for performing range queries or a portion of a query in parallel (which may also be distributed to other storage hosts with other query engine performing other ranges).

Query evaluation and planning 430 may generate a final query plan to perform the query and submit it to query execution platform 480, which may include various features to perform the plan including, but not limited to, data extraction 440, metadata generation 450, query evaluation 460, and output generation 470). In some embodiments, the final query plan may be output as code, executables, or other instructions that may be consumed or otherwise input and performed by query execution platform 480.

Data extraction 440 may retrieve object data 444 from storage devices 442. In some embodiments, data extraction may implement different data parsers for different formats of data (e.g., CSV, AVRO, JSON, Parquet, etc.). As discussed below with regard to FIG. 7, in some embodiments only identified fields of data records may be materialized in order to reduce the costs of extracting and parsing data. The extracted data may, in some embodiments be provided to metadata generation 450.

Metadata generation 450 may perform various analyses or techniques to collect different kinds of metadata. For example, as discussed below with regard to FIG. 6, metadata generation 450 may determine the number of values, distribution of values, or other table statistics, or may determine features of the structure of the data such as record boundaries or offsets, or logical information such as table schema information like column names, column data types, etc.). Metadata generation 450 may store the metadata in object metadata 452, in some embodiments and/or output some or all of the metadata, as discussed below.

Query evaluation 460 may evaluate retrieved and parsed object data with respect to query predicates or other criteria in order to identify data that satisfies the query in order to be included in a result of the query. In some embodiments, query evaluation 460 may implement various kinds of filtering or search functionalities in addition to or instead of query functionalities (e.g., syntax similar to that used for the Linux "grep" utility, in which regular expressions are used to indicate the subset of records to be retrieved, may be employed). In at least one embodiment, a program that is to be invoked at or by the object storage service to determine whether a given record is to be included in a result set may be specified by the client in the request to query (which may be invoked by query evaluation 460). Such a program may, for example, be executed using an event-driven computing service of a provider network that performs functions, operations, or previously provided executables in response to requests that trigger the performance of the functions, operations, or previously provided executables. In a scenario in which a client indicates a program to be used to filter record contents, the logic of the program may remain opaque to the service in at least some embodiments—that is, the conditions or predicates that are being evaluated by the program may not be exposed or revealed to the service.

Output generation 470 may format, combine, and or send query results 404 (and metadata if applicable), in various embodiments. In some embodiments, query results 404 may be combined at a coordination node or other component of query coordination 238 before transmission to a client. Whereas in other embodiments, query results 404 may be sent directly to a requesting client.

Figure 5:
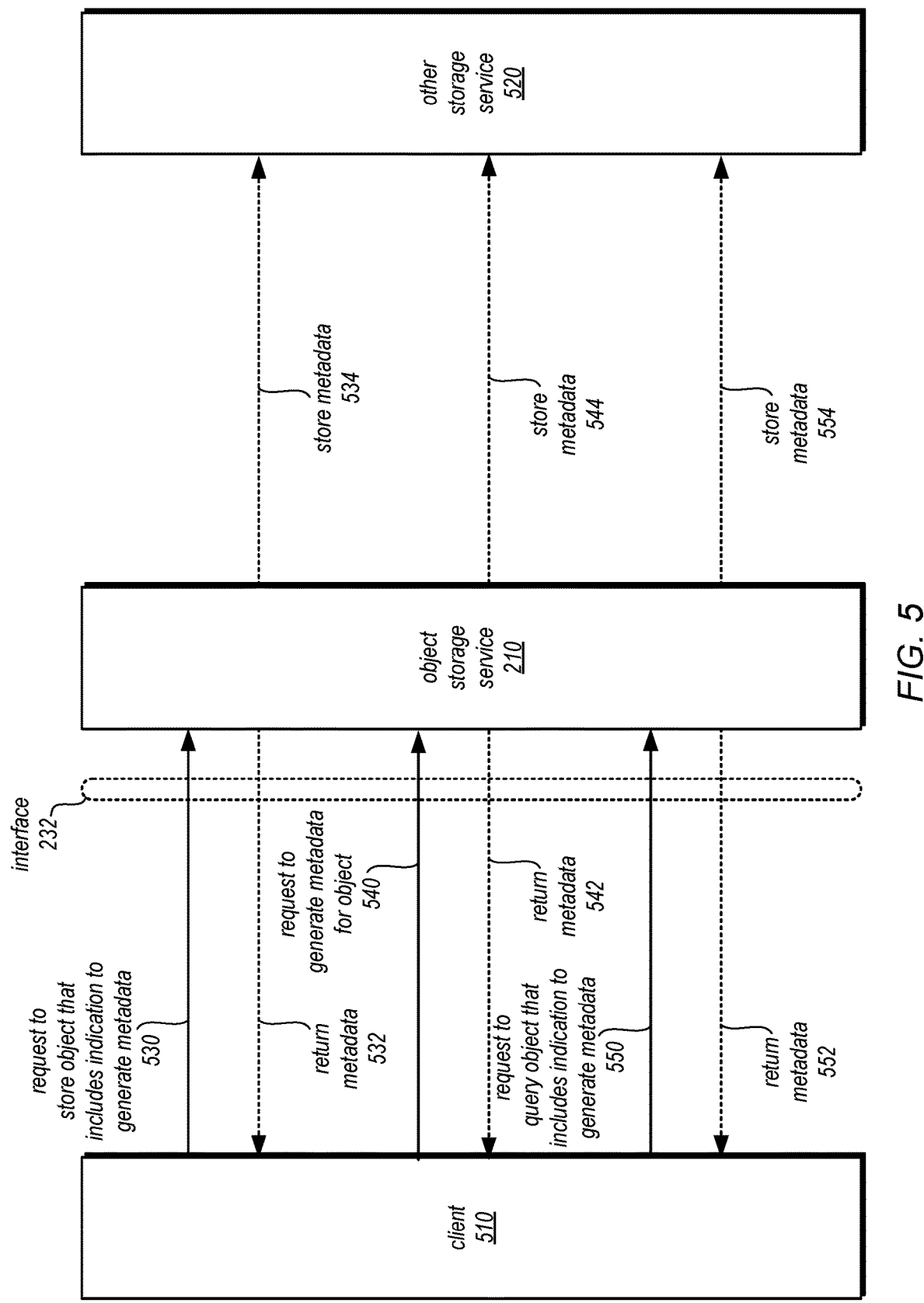
FIG. 5 is a logical block diagram illustrating interactions between a client and object storage service, according to some embodiments.

FIG. 5 is a logical block diagram illustrating interactions between a client and object storage service, according to some embodiments. Client 510, which may be similar to clients 202 discussed above with regard to FIG. 2 or other client systems, applications or processes (which may be implemented or hosted within provider network 200 on a resource hosted by another service in provider network 200). Client 510 may utilize interface 232 to submit various requests which may cause generation of metadata useful for a subsequent query to a data object stored in object storage service 210. For example, as indicated at 530, a request to store (or upload, move, copy, or modify) a data object may be submitted via interface 232. As part of the formatting of the request 530, an indicator, flag, or other parameter may be set which may trigger a scan and generation of metadata for the targeted object, in some embodiments. The request may, in some embodiments indicate what type of metadata to generate (e.g., record boundaries or other structural information, table statistics or other information descriptive of the content of the data object, etc.). Object storage service 210 may generate the metadata as part of responding to request 530 (e.g., storing the data object). As indicated by the dotted lines, the metadata may be returned 532 to client 510 and/or stored 534 to another location, such as other storage service 520 (which may be a relational or a non-relational data store, in some embodiments).

Similarly, other requests may cause generation of metadata by object storage service 210 for a data object. For example, a request to generate metadata for a data object 540 may be received via interface 232 from client 510, in some embodiments. The request may specify the data object (e.g., by object identifier) as well as what metadata to generate (e.g., what type or a default setting or set of metadata), in some embodiments. Object storage service 210 may generate the metadata in response to the request 540 by initiating a scan and perform the various techniques discussed above with regard to FIG. 4 and below with regard to FIG. 6. As indicated by the dotted lines, the metadata may be returned 542 to client 510 and/or stored 544 to another location, such as other storage service 520.

A request to query a data object that includes an indication to generate metadata may be received, as indicated at 550, in some embodiments. A scan operation may already be initiated to perform the query (as discussed above with regard to FIG. 4) and thus the metadata (which may be specified by the indication) may be generated in addition to performance of the query. As indicated by the dotted lines, the metadata may be returned 542 to client 510 and/or stored 544 to another location, such as other storage service 520.

Figure 6:
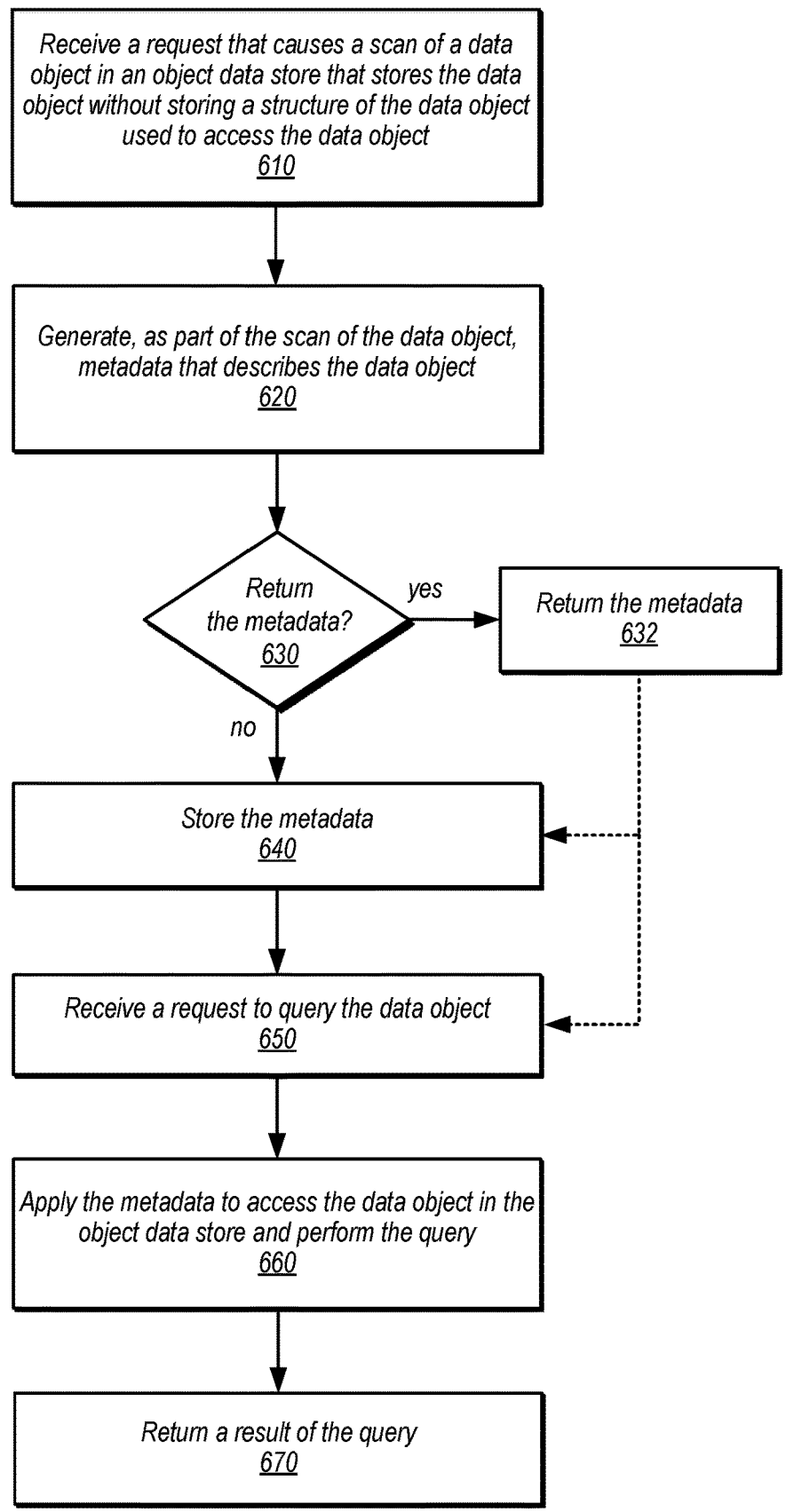
FIG. 6 is high-level flowchart illustrating various methods and techniques for generating metadata from a scan of a data object in an object data store for performing subsequent queries to the data object, according to some embodiments.

The examples of implementing generating metadata from a scan of a data object in an object data store for performing subsequent queries to the data object as discussed above with regard to FIGS. 2-5 have been given in regard to an object storage service offered by a provider network. Various other types or configurations of network-based data stores may implement these techniques. FIG. 6 is high-level flowchart illustrating various methods and techniques for generating metadata from a scan of a data object in an object data store for performing subsequent queries to the data object, according to some embodiments. Various ones of the systems described above may implement some or all of these techniques.

As indicated at 610, a request may be received that causes a scan of a data object in an object data store that stores the data object without storing a structure of the data object used to access the data object. For example, as discussed above with regard to FIG. 5, various different requests may result in a scan of the data object. A request to store the data object may, in one embodiment, cause the scan of the data object. The store request may explicitly indicate or request that metadata is to be collected or otherwise generated (e.g., according to a parameter, flag, value, setting, or other feature of the request). In some embodiments, a store request may automatically trigger the generation of metadata by automatically causing a scan of the data object to be stored. The request that causes the scan may be a request to generate the metadata, as discussed above with regard to FIG. 5, in some embodiments. Also discussed above with regard to FIG. 5 are queries to the data object that cause a scan of the data object, in some embodiments. As discussed above with regard to FIG. 1, an object data store that does not store a structure for accessing data objects in the data store may have to scan data objects in order to evaluate them in order to perform a query, in some embodiments. Similarly, other requests that cause a scan of the data object (e.g., requests to compress the data object, requests to move or copy the data object, etc.) may also be received.

As indicated at 620, metadata that describes the data object may be generated as part of the scan of the data object, in various embodiments. For example, different metadata may be specified or identified for generation. If, for instance, a request is made to generate the metadata, then the request may identify what type of metadata to generate. Column or other table statistics for a table (or database that includes multiple tables) that is a data object may be requested or record boundaries for determining offsets between records in the object data store, may be requested or otherwise specified. In some embodiments, a default set of metadata (including multiple different types of metadata) may be collected.

In at least some embodiments, the generated metadata may be record boundaries for records in table(s) of a database that is stored as part of (or as) the data object. The data object may be scanned according to units for which boundaries or locations within the data object can be determined (e.g., scanning the data object byte by byte), in some embodiments. As the units are scanned, individual records may be materialized and from the materialized record, the offset of each record (according to the units) may be determined from the number of units in an individual record (e.g., the number of bytes from one record delimiter to another-which may be provided as part of a request that causes the scan to access the data). A record boundary value may be tracked (which may be initialized according to value specified in a request that causes the scan (e.g., 50 MB) or a default value) so that the number of units in a record are counted and set as the record boundary value for the record. In this way, the offsets of individual records can be determined. Multiple record boundary values may be generated as part of the metadata (e.g., recorded as unit offsets, such as byte offsets).

In at least some embodiments, the generated metadata may be statistical information about a table or tables in the data object. For example, the metadata that is generated may be total number of records in a table or the object as a whole and value distributions of columns in the table (e.g., the distribution of the field values for that column). In some embodiments, the structure of metadata, including the logical structure (e.g., number/data type of columns, fields or attributes of items in the data object) may be generated as part of the metadata. Note that various other examples of metadata applicable for optimizing or performing queries to the data object and thus previous examples are not intended to be limiting.

As indicated at 630, in some embodiments, the metadata may be returned. For example, the metadata may be returned automatically upon generation to a client or application that submitted the request that caused the scan of the data object. In some embodiments, metadata may also be returned if requested (as discussed above). If the metadata is to be returned, as indicated at 632, various techniques for returning the metadata may be performed. For example, the metadata may be included as part of a results or data stream in response to a query or the metadata may be returned according to an application programming interface (API) via which the request that caused the scan was received. In some embodiments, the metadata may be directed to a different system, client, or application than submitted the request that caused the scan (e.g., storing a result file or object in a different data store or storage location).

In some embodiments, the metadata may be stored for subsequent use, as indicated at 640. For example, the metadata could be stored as another object in the object data or in a different storage system (e.g., SQL or NoSQL database or storage service) that can be accessed by the object data store for application, in some embodiments. As indicated by the dotted lines from 632 to 640, in some embodiments, the metadata may both be returned and stored.

As indicated at 650, a request to query the data object may be received, in various embodiments. The request may be specified according to a programmatic interface for instance and may include query language statement or criteria for performing the query. A SQL statement, for instance, or other parameters that specify predicates for evaluating whether data in the object satisfies the query may be included. In some embodiments, the request to query may specify features of the data object in order to accomplish the query (as the object data store may not store a structure of the data object for accessing the data object). For example, the request may include a file type of the object (e.g., comma separate value (CSV), Javascript object notation (JSON), etc.), record delimiter characters, field delimiter characters, quotation or comment characters, or other information for interpreting the data object (e.g., compression schemes applied, encryption schemes applied, etc.).

As indicated at 660, the metadata may be applied to access the data object in the object data store and perform the query, in some embodiments. For example, the query may specify range(s) of data to query according to the units that described record offsets (as discussed above), and query engines at one (or multiple) storage hosts may utilize the offset information to only scan the specified range(s). In some embodiments, the metadata may allow for the implementation of parallel processing in scenarios where the data object is stored in distributed fashion across multiple storage hosts-instead of performing a serial or non-parallelized scan of the data object across the storage hosts (which would increase the length of time to perform a query considerably, in some circumstances).

In another example, metadata may be applied to optimize or modify performance of a query. For instance, a query optimizer may select among different query plans to perform the query according to cost information that may be determined from table statistics which may be generated as part of the metadata (e.g., by estimating the cardinality, or number of rows, in the query result to be returned according to predicates or other criteria in the query). For example, based on this statistical information, a query optimizer may select one operator over another (e.g., to use the index seek operator or a more resource-intensive index scan operator) in order to provide optimal query performance. In another example, the join order of performing a query that joins data from different tables (in the same or different objects) may be decided according to the statistical information generated in the metadata. In this way, a join that significantly reduces a potential result can be performed first so that later joins can be performed without using as much computing resources (e.g., memory, processor, persistent storage, etc.). Various different types of join operations may be benefit from join reordering using metadata generated for a data object (e.g., hash-based joins, nested loop joins, inner joins, outer joins, etc.).

In some embodiments, the metadata may be provided or included in the request to perform the query (e.g., as the metadata was previously returned, as indicated at 632). In other embodiments, the stored metadata may be accessed in order to apply the metadata to perform the query.

As indicated at 670, a result of the query may be returned, in various embodiments. For example, the results (or lack thereof) may be indicated via the same interface, protocol, language, or other communication technique via which the request to query the data object was received.

Figure 7:
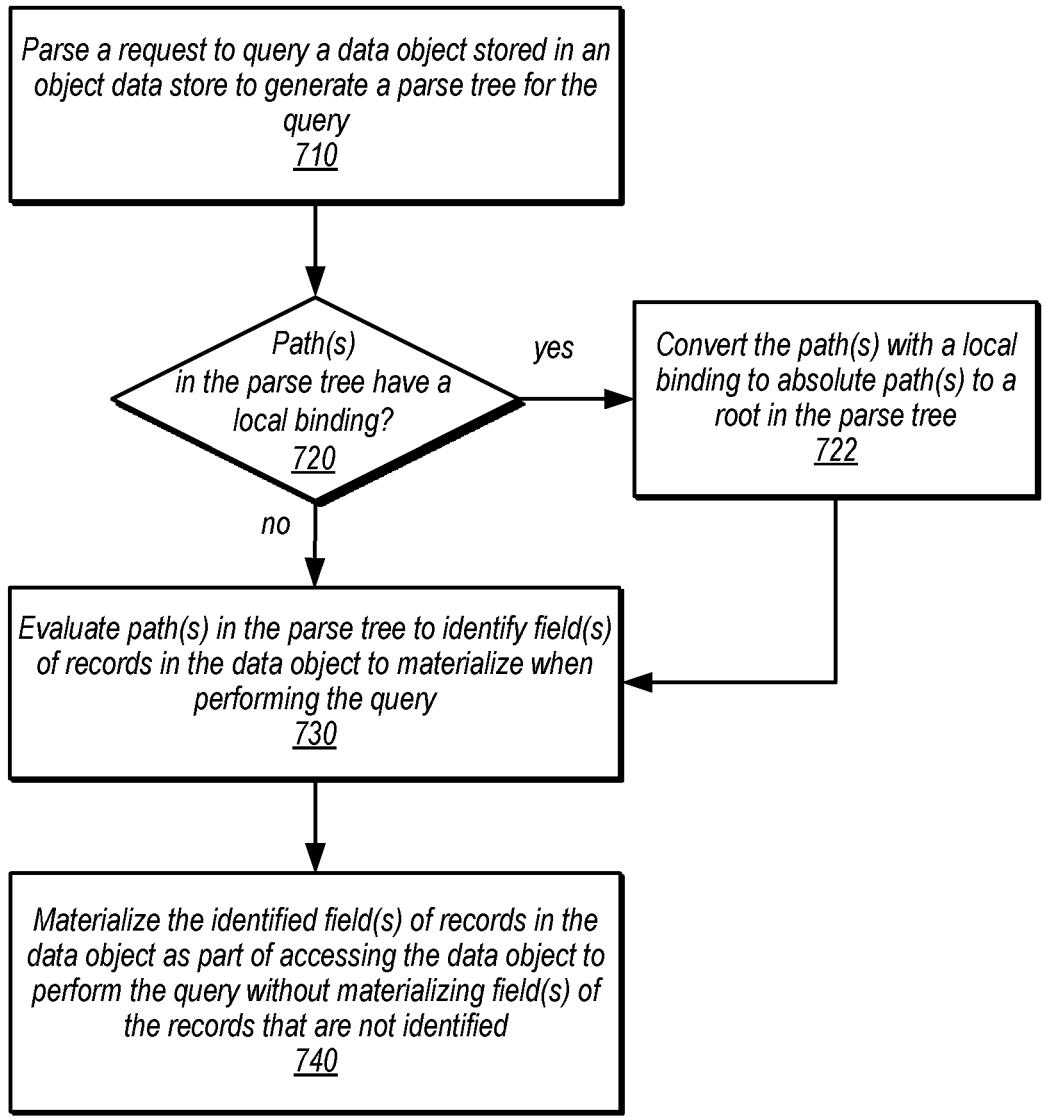
FIG. 7 is a high-level flowchart illustrating various methods and techniques for identifying fields in records of a data object to materialize, according to some embodiments.

Further optimizations, in addition to the application of metadata generated in response to previously received requests that caused a scan of a data object may be implemented, in some embodiments. For example, because an object data store may not require a schema or other structural information in order for a client to upload and store an object, no such information may be available when performing a query. However, as many queries do not use or reference data from every field (e.g., use data from every column in a record), significant cost savings can be obtained if only those fields in a record that are used to perform the query are materialized (e.g., parsed and formatted to be processable by a query engine for evaluation). FIG. 7 is a high-level flowchart illustrating various methods and techniques for identifying fields in records of a data object to materialize, according to some embodiments.

As indicated at 710, a request to query a data object stored in an object data store may be parsed to generate a parse tree for the query, in various embodiments. For example, the various operators, objects, fields, names, labels, or other identifiers may be structured as a parse tree for evaluation. FIGS. 8A and 8B are example parse trees for identifying fields in records of a data object to materialize, according to some embodiments. The query 810 in FIG. 8A that selects from data object s where a field "3" is a string, can be represented as parse tree 820. Similarly, query 830 in FIG. 8B can be represented as a parse tree 840 (which illustrates the various operations, such as inner-join, and paths to locate the data).

As indicated at 720, some path(s) in a parse tree may have a local binding, in some embodiments. For example, a local binding may be derived from another binding, such as is the case in parse tree 840 where binding p is derived from another binding e which is bound to existing field "employees" in "hr" table. If a data path has a local binding, then a path to the local binding may be converted into an absolute binding. For instance, if parse tree 840 were amended to have the "projects" path, that points to "e" have an additional path that points to the path of "e" which is "e" pointing to "hr." Such local bindings may be utilized if the data is semi-structured or nested (e.g., an employee record can have multiple project field values instead of one). As indicated at 722, for paths that have a local binding, the path(s) may be converted to absolute path(s) to a root in the parse tree (e.g., so that a path can be traveled from a leaf binding that is global up to the root of the parse tree, such as "Select" in parse trees 820 and 840).

As indicated at 730, path(s) of the parse tree may be evaluated to identify field(s) of records in the data object to materialize when performing the query, in various embodiments. For example, the parse trees may be traversed according to an order, such as "From" "Where" "GroupBy" "List (or Projection)". When visiting each top-level node, descendant nodes may be traversed. During this process, if a Path or Id node is discovered, it is added to a tracking set (e.g., stored in a cache). After tree traversal is finished, all the discovered paths in the tracking set may be provided as the identified fields for materialization.

As indicated at 740, the identified field(s) of records in the data object may be materialized as part of accessing the data object to perform the query without materializing field(s) of the records that are not identified, in some embodiments. For example, as a field is scanned in it may be discarded as soon as it is determined not to be an identified field for materialization so that the field is not parsed and passed as a value to be evaluated for the query, in some embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments of generating metadata from a scan of a data object in an object data store for performing subsequent queries to the data object as described herein may be executed on one or more computer systems, which may interact with various other devices. FIG. 9 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the embodiments described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may be a storage host, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a multi-tenant provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    an object data store, comprising:
        one or more computing devices, respectively comprising a processor and a memory; and
        one or more storage devices that store a data object as unstructured data, wherein the unstructured data comprises a byte sequence without storing information indicating a structure used to access the data object and the data object includes a range of records;
    wherein the object data store is configured to:
        receive a request to scan the unstructured data of the data object in the one or more storage devices;
        generate metadata for the data object that provides structural information for the unstructured data of the data object, wherein the metadata comprises respective offsets for a plurality of records of the byte sequence, the respective offsets determined according to respective numbers of bytes determined from parsing from one record delimiter character to another in the byte sequence based on the scanned the unstructured data of the data object;
        store the generated metadata of structural information for the unstructured data of the data object in a metadata store;
        receive a request to perform a query on a range of records of the data object, and responsive to receiving the request:
            access the stored metadata at the metadata store to generate a plan to perform the requested query, the plan generated in accordance with the respective offsets for the plurality of records in the stored metadata;
        perform the query on the range of records of the data object in the one or more storage devices according to the generated plan; and
        return a result of the query.

2. The system of claim 1, wherein the request to scan the data object is a query.

3. The system of claim 1,
    wherein the object data store further configured:
        sends the generated metadata to a client;
    wherein the request to perform the query on the data object is received from the client and includes one or more parameters to perform the query that utilize the metadata.

4. The system of claim 1, wherein the object data store is an object storage service offered as part of a provider network, wherein the object storage service comprises a network interface, and wherein the request to scan of the data object and the request to perform the query on the data object are received via the network interface from one or more clients.

5. A method, comprising:
receiving a request to scan unstructured data of a data object stored in an object data store, wherein the unstructured data comprises a byte sequence without storing information indicating a structure used to access the data object;
generating metadata based on the scanned unstructured data of the data object, wherein the metadata comprises respective offsets for a plurality of records of the byte sequence according to respectively determined numbers of bytes determined from parsing from one record delimiter character to another record delimiter in the byte sequence;
storing the metadata at a metadata store;
receiving a request to perform a query on a range of records of the data object in the object data store;
performing the query on the range of records of the data object in the object data store, comprising:
accessing the stored metadata at the metadata store to generate a plan to perform the query, the plan generated according to the respective offsets for the plurality of records in the stored metadata; and
performing the query on the range of records of the data object according to the generated plan; and
returning a result of the query.

6. The method of claim 5, wherein the request to scan the data object is a query.

7. The method of claim 5, wherein the request to scan the data object is a metadata generation request for the data object.

8. The method of claim 5, wherein performing the query further comprises performing the query on a different range of records of the data object in parallel with the range of records.

9. The method of claim 5,
wherein the method further comprises:
after generating the metadata, sending the metadata to a client;
wherein the request to perform the query on the data object is received from the client and includes one or more parameters to perform the query that utilize the metadata.

10. The method of claim 5,
wherein the data object is a table;
wherein the method further comprises:
parsing the request to perform the query on the data object to generate a parse tree for the query;
evaluating one or more paths in the parse tree to identify one or more fields of the records to materialize when performing the query.

11. The method of claim 10,
wherein the data object includes one or more nested records;
wherein evaluating the parse tree to identify one or more fields of the records comprises:
converting one of the one or more paths to one of the one or more fields to an absolute path to a root in the parse tree; and
traversing the converted absolute path in the parse tree to identify the field for materialization.

12. The method of claim 5, wherein the object data store is an object storage service offered as part of a provider network, wherein the request to query the data object is received according to an Application Programming Interface (API) for the object storage service.

13. A non-transitory, computer-readable storage medium, storing program instructions that when executed by one or more computing devices cause the one or more computing devices to implement:
storing a data object in an object data store as unstructured data, the unstructured data comprising a byte sequence without storing information indicating a structure used to access the data object;
generating metadata based on the scanned unstructured data of the data object, wherein the metadata comprises respective offsets for a plurality of records of the byte sequence according to respectively determined numbers of bytes determined from parsing from one record delimiter character to another record delimiter in the byte sequence;
storing the generated metadata in a metadata store;
receiving a request to perform a query on a range of records of the data object in the object data object, and responsive to receiving the request:
accessing the stored metadata at the metadata store to generate a plan to perform the query, the plan based, at least in part, on the respective offsets for the plurality of records in the data object included in the stored metadata;
performing the query on the range of records of the data object in the one or more storage devices according to the generated plan; and
returning a result of the query.

14. The non-transitory, computer-readable storage medium of claim 13, wherein the request to scan the data object is a query.

15. The non-transitory, computer-readable storage medium of claim 13,
wherein the program instructions cause the one or more computing devices to further implement:
after generating the metadata, sending the metadata to a client;
wherein the request to perform a query on the data object is received from the client and includes one or more parameters to perform the range query that utilize the metadata.

16. The non-transitory, computer-readable storage medium of claim 13, wherein the data object comprises a plurality of tables, wherein the metadata comprises respective value distributions for different columns of the tables, and wherein, in accessing the data object in the object data store to perform the range query based, at least in part, on the metadata, the program instructions cause the one or more computing devices to implement ordering a plurality of join operations to join two or more of the tables to perform the range query according to the respective value distributions for the different columns of the tables.

17. The non-transitory, computer-readable storage medium of claim 13, wherein the request to scan the data object is a request to store the data object in the object data store that includes an indication to scan the data object and generate the metadata as part of storing the data object.

18. The non-transitory, computer-readable storage medium of claim 13,
wherein the data object is a table;
wherein the program instructions cause the one or more computing devices to further implement:
parsing the request to perform the range query on the data object to generate a parse tree for the range query;

evaluating one or more paths in the parse tree to identify one or more fields of the records to materialize when performing the range query.

19. The non-transitory, computer-readable storage medium of claim 13, wherein the request to scan the data object is a metadata generation request for the data object.

* * * * *